United States Patent
Krause et al.

(10) Patent No.: US 7,634,542 B1
(45) Date of Patent: Dec. 15, 2009

(54) SYSTEM AND METHOD TO MANAGE SERVICE INSTANCES FOR REQUEST PROCESSING

(75) Inventors: Alan S. Krause, Fairway, KS (US); Charles L. Micklavzina, Overland Park, KS (US); Kevin R. Niederhauser, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 830 days.

(21) Appl. No.: 11/173,246

(22) Filed: Jul. 1, 2005

(51) Int. Cl.
*G06F 15/16* (2006.01)

(52) U.S. Cl. ................ 709/206; 719/315

(58) Field of Classification Search ......... 709/206; 719/315
See application file for complete search history.

(56) References Cited

U.S. PATENT DOCUMENTS

| | | | |
|---|---|---|---|
| 6,425,017 B1 * | 7/2002 | Dievendorff et al. | 719/315 |
| 6,434,605 B1 * | 8/2002 | Faulkner et al. | 709/213 |
| 6,490,251 B2 * | 12/2002 | Yin et al. | 370/236.1 |
| 6,615,215 B1 * | 9/2003 | Petty | 707/101 |
| 7,127,507 B1 * | 10/2006 | Clark et al. | 709/224 |
| 7,149,291 B1 * | 12/2006 | Deshpande | 379/112.01 |
| 7,185,073 B1 * | 2/2007 | Gai et al. | 709/221 |
| 2002/0144006 A1 * | 10/2002 | Cranston et al. | 709/312 |
| 2003/0135542 A1 * | 7/2003 | Boudreau | 709/203 |
| 2007/0156808 A1 * | 7/2007 | Koegel et al. | 709/203 |
| 2008/0103686 A1 * | 5/2008 | Alberth et al. | 701/200 |

OTHER PUBLICATIONS

Bultan, T., Fu, X., Hull, R., and Su, J. 2003. Conversation specification: a new approach to design and analysis of e-service composition. In Proceedings of the 12th international Conference on World Wide Web (Budapest, Hungary, May 20-24, 2003). WWW '03. ACM, New York, NY, 403-410.*

Litiu, R. and Parakash, A. 2000. Developing adaptive groupware applications using a mobile component framework. In Proceedings of the 2000 ACM Conference on Computer Supported Cooperative Work (Philadelphia, Pennsylvania, United States). CSCW '00. ACM, New York, NY, 107-116.*

Litiu, Radu, et al., "Developing Adaptive Groupware Applications Using a Mobile Component Framework," Department of Electrical Engineering and Computer Science, Published in 2000, pp. 107-116.

Litiu, Radu, et al., "Developing Adaptive Groupware Applications Using a Mobile Component Framework," Synopsis of Portal USPTO, Jan. 31, 2009, Published in New York, US, 5 pages.

Bultan, Tevfik, et al., "Conversation Specification: A New Approach to Design and Analysis of E-Service Composition," Published in May 2003, pp. 403-410.

Bultan, Tevfik, et al., "Conversation Specification: A New Approach to Design and Analysis of E-Service Composition," Synopsis of Portal USPTO, Jan. 31, 2009, Published in New York, US, 6 pages.

* cited by examiner

*Primary Examiner*—Vivek Srivastava
*Assistant Examiner*—Ajay Bhatia (57) ABSTRACT

A tool is provided to manage service instances for request processing that includes a monitor component, a manager component, and a configuration component. The monitor component is operable to determine a depth of message requests in a queue. The manager component is operable to manage a number of service instances processing the message requests. The configuration component is operable to set a threshold depth of message requests in the queue such that when the monitor component determines the depth of message requests in the queue exceeds the threshold, the monitor component initiates additional service instances to process the message requests.

10 Claims, 4 Drawing Sheets

SYSTEM AND METHOD TO MANAGE SERVICE INSTANCES FOR REQUEST PROCESSING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer systems, and more particularly, but not by way of limitation, to service broker dynamically updatable master process list.

BACKGROUND OF THE INVENTION

Large business enterprises typically include computer systems that need to be monitored for efficiencies and for other reasons. Monitoring the computer system may promote analysis of application processing and management of application operating conditions. Examples of such systems are mainframe and PC computer networks, which may include queues for handling message requests.

SUMMARY OF THE INVENTION

According to one embodiment, the present disclosure is directed to a tool to manage service instances for request processing comprising a monitor component, a manager component, and a configuration component. The monitor component is operable to determine a depth of message requests in a queue. The manager component is operable to manage a number of service instances processing the message requests. The configuration component is operable to set a threshold depth of message requests in the queue such that when the monitor component determines the depth of message requests in the queue exceeds the threshold, the monitor component initiates additional service instances to process the message requests.

According to another embodiment, the present disclosure is directed to a method for managing service instances processing message requests in a queue. The method includes initiating one or more service instances to process message requests in a queue. The method also includes determining a depth of message requests in the queue and initiating additional service instances to process message requests when the depth of message requests in the queue exceed a threshold.

According to another embodiment, the present disclosure is directed to a data processing system comprising a plurality of message queues, a plurality of service instances, and a service instance controller. The plurality of message queues each have a service instance to receive and store a message request. The service instances each have associated with it one of the message queues. Each service instance is operable to process requests on one of the message queues. Also, the service instance controller is operable to monitor the depth of requests on each message queue, to create new service instances associated with a message queue with a depth of requests that exceeds a queue depth threshold, to monitor an idle time of service instances, and to stop service instances when the idle time of the service instance exceeds an idle time threshold.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Computer enterprises employ only as many computers and as much computer processing power as necessary to handle the load required to process the business load. However, as new business products and services are brought into existence, the load on the business' computer system is increased. To handle this problem, certain people in the organization may be charged with forecasting the additional load on the computer systems that will be generated by the new products and services. One place that computer transaction bottlenecks may occur is in large systems that include message queues that handle the message transactions. Message queues typically receive and field requests from the computer system for information and services. The actual queue processes that field these requests for information or services may be referred to as service instances. The more requests that are generated, the more service instances are necessary to field those requests. It takes extra memory and CPU power to field all of these transactions. So, typically it may be desirable to have a minimum number of service instances operating to field the message requests while being able to dynamically respond to increased traffic. The present system is directed, according to one embodiment, to a monitor component that determines the depth of the message requests in the message queues. The present disclosure also includes a manager component to manage the number of service instances that are executing on these message queues to field the message requests. The system also includes a configuration component operable to set a threshold depth of message requests in the message queues.

Figure 1:
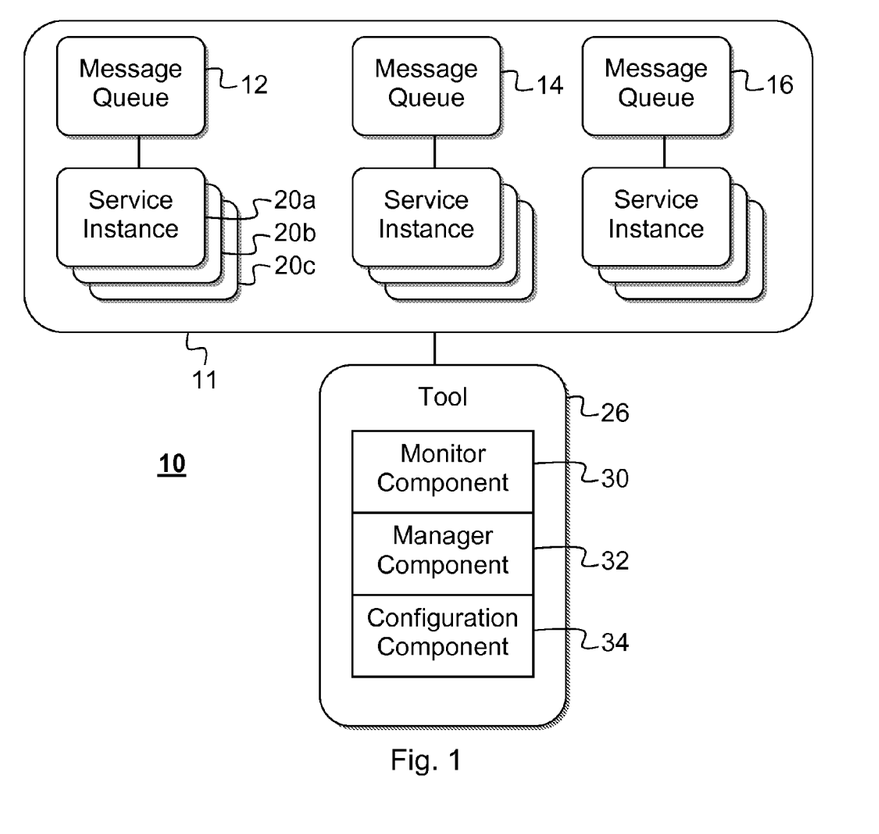
FIG. 1 is a block diagram that depicts an application monitoring and management system according to one embodiment of the present disclosure.

Turning now to FIG. 1, a block diagram illustrates one embodiment of a data management system 10. The data management system 10 includes one or more message queues which may be part of a queue cluster 11. A queue cluster 11 includes a first message queue 12, a second message queue 14, and a third message queue 16. For purposes of simplicity and clarity of this disclosure, only message queue 12 will be described in its entirety although other message queues 14, 16 operate substantially similar. In another embodiment, more or fewer message queues 12, 14, 16 may form a part of the queue cluster 11. The message queue 12 may be, for example, an IBM MQ Series message queue, a JAVA message service (JMS), or other message services known to one of ordinary skill in the art may be employed. Each message queue 12 is associated with a configurable number of service instances 20a, 20b, 20c. The message queue 12 employs the service instances 20 to process the message requests received by the message queue 12.

Enterprise applications need access to information, which may be requested via the message queue 12. The message queue 12 will receive requests from various systems throughout the enterprise. The service instances 20 that are on the message queue 12 respond to those requests. The message request may be for specific data. The service instances 20 may obtain the data from a data store or database directly. The term data store, as used herein, includes any system or component for storing or maintaining data, which includes, but is not limited to, databases. The service instances 20 may also obtain the data by going through other data services or other applications based on the particular request. In one embodiment, for example, the service instances 20 may make a request of a data repository host and the data repository host may actually retrieve the data, make updates and otherwise process the request and return information or instructions to the service instances 20.

The data management system 10 includes a tool 26. The tool 26 includes a monitor component 30, manager component 32, and a configuration component 34. In this embodiment the monitor component 30 is a daemon program. The monitor component 30 is operable to monitor the depth of the message requests on each message queue 12. The monitor component 30 determines the number of message requests in each of the message queue 12. The manager component 32 is operable to manage the number of services instances processing the message requests. It should be appreciated that the tool 26 is operable for managing all of the queues in the queue cluster 11, such as message queues 14 and 16 as well as other queue clusters.

The monitor component 30 is operable to determine a depth of message requests in a message queue 12. The monitor component 30 may, for example, measure the depth of the message queue 12 periodically, as defined in the configuration component 34. In this embodiment the time period is ten seconds and the threshold depth is five message requests in the message queue 12. Therefore, the message queue 12 determines the message queue 12 depth every ten or so seconds and takes action in the event the message queue 12 depth is greater than five. In another embodiment the time period may be longer or shorter than ten seconds. Also, in another embodiment the threshold depth of message requests may be larger or small than five message requests in the message queue 12.

The manager component 32 is operable to terminate service instances 20 that have not processed message requests within a period, which may be established by the configuration component 34. In this embodiment, the period of time the service instances 20 must remain idle before it is terminated is five minutes. In another embodiment, the time period for service instances 20 termination may be longer or shorter than five minutes. The manager component 32 is also operable to initiate one or more service instances 20 to process message requests in a message queue 12 where the depth of message requests exceed a threshold set by the configuration component 34. In this embodiment, the threshold depth for initiating one or more new service instances 20 is five message requests in the message queue 12. In another embodiment, the threshold depth for service instances 20 initiation may be larger or smaller than five message requests in the message queue 12.

The configuration component 34 is operable for a user to define a minimum and maximum number of service instances 20 that may be running at any time. The configuration component 34 is further operable to define the period of time the service instances 20 must remain idle before it is terminated as well as the depth of messages in the message queue 12 before initiating additional service instances 20.

Idle service instances 20 may be terminated to free enterprise resources, which may then be used by other applications, such as for batch processing or other uses. Further, the data management system 10 may be operable to terminate or notify one or more of these other applications when the message queue server utilization rises and the freed resources become necessary to instantiate more service instances 20.

In one embodiment, the tool 26, such as by the manager component 32, is operable to determine that there is additional processing capacity available, which may have been idled as discussed above by monitoring, for example, the queue depth, server metrics, time of day, and/or other factors. When the additional processing capacity is identified, the manager component 32 is operable, for example, to communicate with front-end systems or other applications, such as applications making requests of the data management system 10, to notify these applications of the availability of additional processing capabilities. In response, these applications may begin processing, for example, batch or other requests or processing that had been delayed until a time when additional processing resources became available. These batch and other processes are generally run at night when computer systems typically have additional resources available. In this manner, the manager component 32 identifies additional processing resources as they become available and utilizes these resources at times when the data management system 10 would otherwise be expected to be too busy to handle any additional load. Thus, the manager component 32 may increase the overall processing capabilities of the data management system 10.

System planners may generate a forecast based on some business event or theory that there will be some additional load placed on the computer system that may generate additional message requests to the message queue 12. Therefore, it is necessary to use additional service instances 20 to field those requests without overloading the data management system 10. According to one embodiment, the number of services instances 20 that will be utilized is based on a maximum number of service instances 20 and the expected time to respond to the additional transactions. In this embodiment, the monitor component polls the message queue 12 every ten seconds to determine whether the depth of message requests in the message queue 12 exceeds the threshold. Based on the number of message requests in the message queue 12, the manager component 32 starts one or more service instances 20 to process the message requests in the message queue 12. For example, in one embodiment the message queue threshold depth is five message requests, the minimum number of service instances 20 is one and the maximum number of service instances 20 based on the forecast is twelve service instances 20. In this example, the monitor component 30 creates additional service instances 20 to process the message requests where the number of message requests in message queue 12 exceeds five, not to exceed twelve service instances 20. In another embodiment, different parameters may be used for establishing the threshold depth of message request, minimum service instances 20, maximum service instances 20 and interval to poll the message queue 12. The configurable threshold framework allows the data management system 10 to handle high demand periods by more readily adapting to changing processing loads. The data management system 10 also prevents high user traffic from overloading the host machines that are handling the actual processing.

Figure 2:
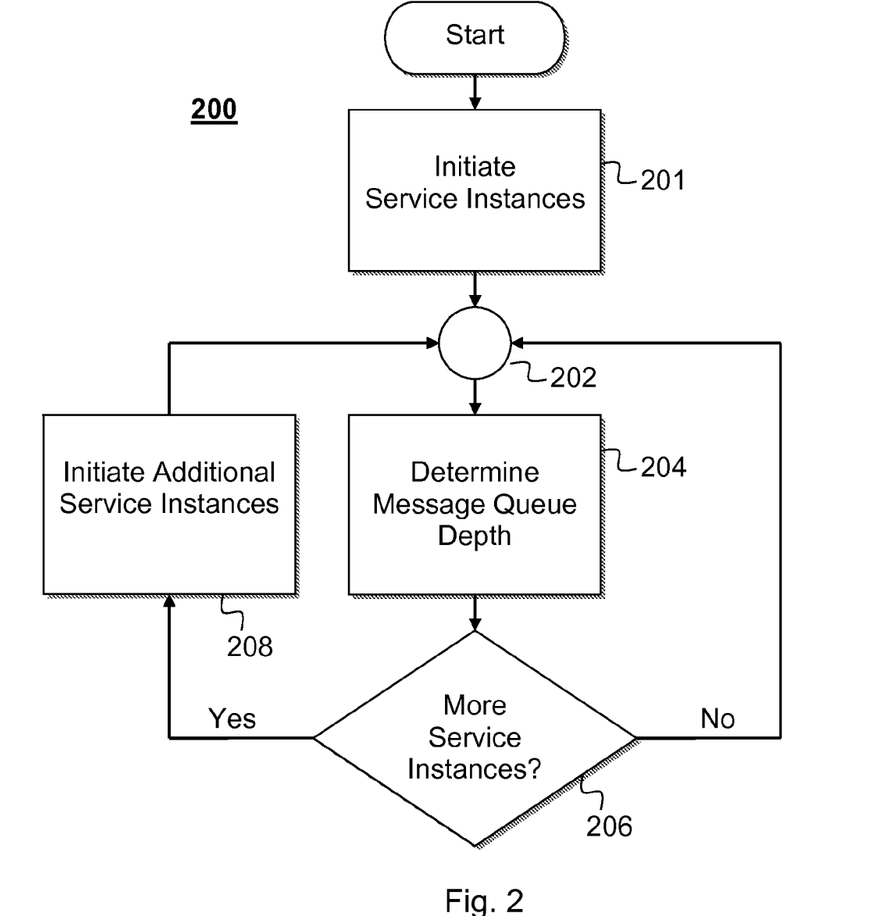
FIG. 2 is a flowchart that depicts a method for polling and initiating additional service instances based on a configurable threshold.

Turning now to FIG. 2, a flowchart illustrates a method 200 for initiating one or more service instances 20 to process message requests in the message queue 12. The method includes, at a block 201, the initiation of one or more service instances 20. This may be accomplished by the manager component 32 initiating another service instance 20 on the message queue 12. At a block 204, the message queue 12 depth is determined. The monitor component 30 checks the number of message requests in the message queue 12. At a block 206, the manager component 32 determines whether to initiate additional service instances 20 based on whether the message queue 12 has a depth of five message requests in the message queue 12. If the manager component 32 determines no additional service instances 20 are required, the process returns to point 202 to repeat the cycle. At a block 208, additional service instances 20 are initiated to process message requests whenever there are five or more message requests in message queue 12. The process then returns to point 202 to repeat the cycle.

Figure 3:
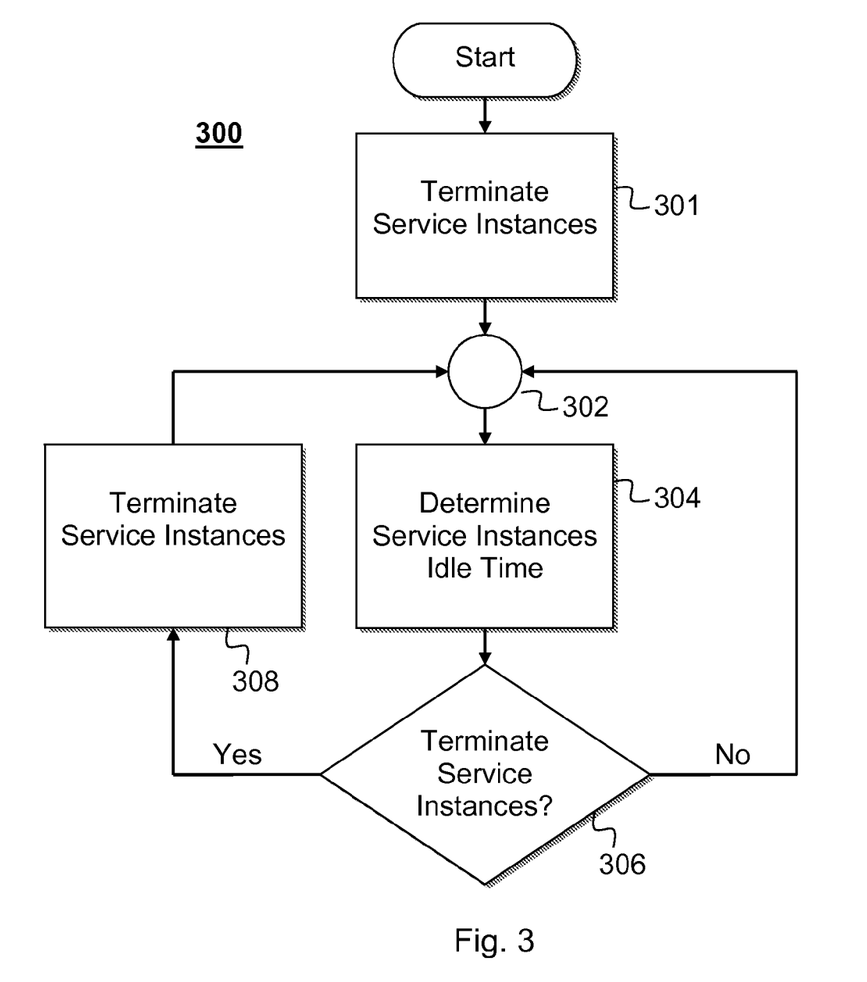
FIG. 3 is a flowchart that depicts a method for terminating service instances based on a configurable threshold.

Turning now to FIG. 3, a flowchart of a method 300 for terminating one or more service instances 20 on the message queue 12 is provided. The method includes, at a block 301, the termination of the service instances 20, which may be accomplished by the manager component 32 terminating the service instances 20 on the message queue 12. At a block 304, the service instances 20 idle time is determined. The manager component 32 determines the length of time the service instances 20 has been idle. At a block 306, the manager component 32 determines whether to terminate the service instances 20 based on the length of time the service instances 20 has remained idle. If the manager component 32 determines there are no service instances 20 that exceed the threshold time limit, the process returns to point 302 to repeat the cycle. At a block 308, the service instances 20 is terminated where the manager component 32 determines the service instances 20 has been idle for five minutes. The process then returns to point 302 to repeat the cycle.

Figure 4:
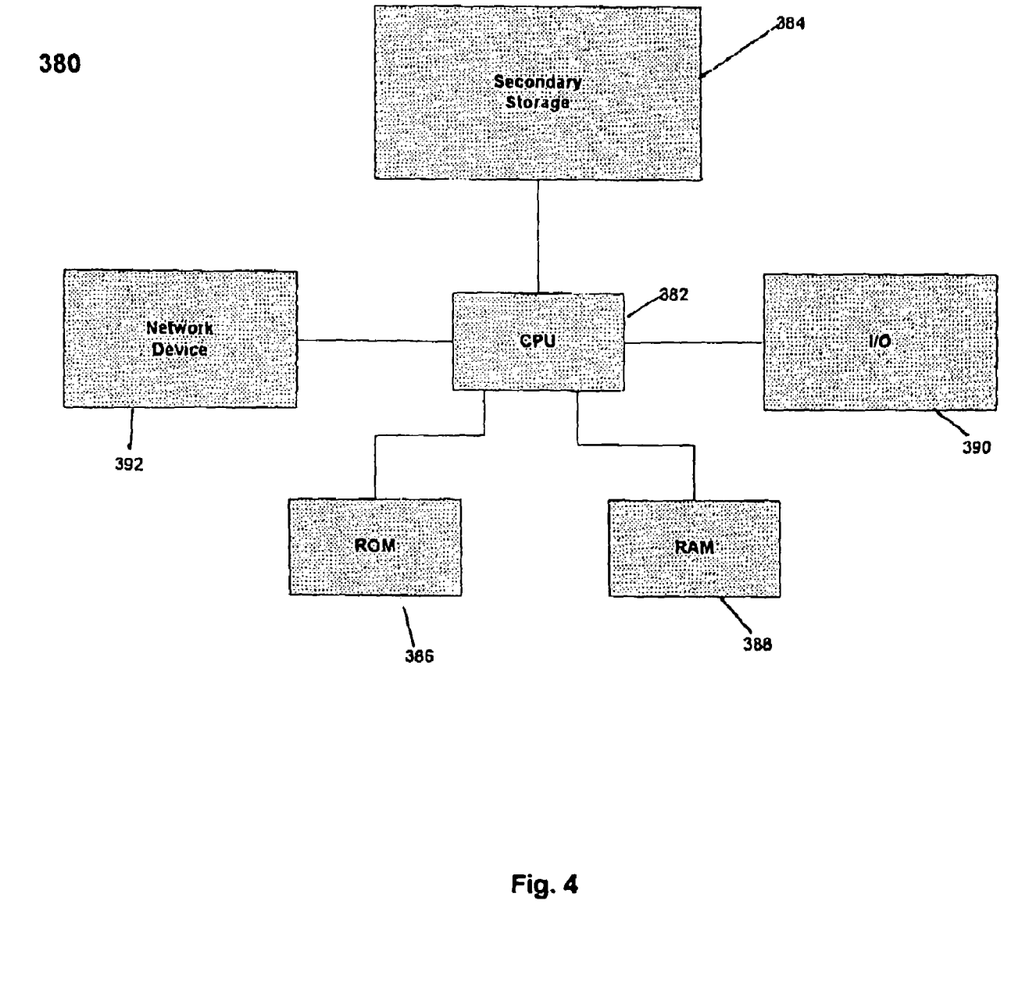
FIG. 4 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A tool to manage service instances for request processing, the tool stored on at least one computer readable storage medium and comprising at least one processor, the tool further comprising:
   a monitor component stored on a computer readable storage medium and executable by a processor to determine a depth of message requests in a queue;
   a manager component stored on a computer readable storage medium and executable by a processor to manage a number of service instances that are processing the message requests, wherein the manager component is further executable to stop service instances that have not processed message requests within an idle time threshold, and wherein the manager component is further executable to determine a message queue server utilization;
   a configuration component stored on a computer readable storage medium and executable by a processor to set a threshold depth of message requests in the queue such that when the monitor component determines the depth of message requests in the queue exceeds the threshold, the monitor component initiates additional service instances to be executed to process the message requests, wherein the configuration component is further executable to define both a minimum number of service instances and a maximum number of service instances that process the message requests at a time;
   a notification component stored on a computer readable storage medium and executable by a processor to issue a first notification that notifies an application when the message queue server utilization drops below a minimum utilization threshold to prompt the application to generate message requests to increase the message queue server utilization; and
   wherein the notification component is further executable to issue a second notification, wherein the second notification notifies the application when the depth of message requests in the queue raises above a second threshold, and wherein the second notification prompts the application to reduce the message requests from the application.

2. A method for managing service instances processing message requests in a queue, the method implemented by executing, using at least one processor, instructions stored on at least one computer readable storage medium, the method comprising:
   executing one or more service instances, the one or more service instances processing message requests in a queue;
   determining, with a monitor component stored on a computer readable storage medium and executed by a processor, a depth of message requests in the queue;
   initiating, with a manager component stored on a computer readable storage medium and executed by a processor, execution of additional service instances to process message requests when the depth of message requests in the queue exceed a threshold, wherein the initiating additional service instances is limited to a maximum number of service instances;
   generating a forecast of a transaction;
   determining a predicted response time of a transaction;
   configuring, with a configuration component stored on a computer readable storage medium and executed by a processor, the maximum number of service instances based on both the forecast of the transaction and the response time of the transaction;
   determining, with the manager component, a message queue server utilization;
   issuing, with the manager component, a first notification notifying an application of additional processing capability when the message queue server utilization drops below a minimum threshold, and wherein the first notification further prompts the application to generate message requests to increase the message queue server utilization;
   issuing, with the manager component, a second notification notifying the application when the message queue server utilization rises above a maximum utilization threshold, wherein the second notification further prompts the application to reduce the message requests from the application.

3. The method of claim 2, further including:
   stopping a service instance when the service instance has been idle longer than a time threshold.

4. The method of claim 3, further including:
   configuring the time threshold.

5. The method of claim 2, further including:
   starting one or more optional applications when the message queue server utilization drops below a minimum utilization threshold; and
   stopping one or more optional applications when the message queue server utilization rises above a maximum utilization threshold.

6. A data processing system comprising at least one computer readable storage medium and at least one processor, the data processing system further comprising:
   a plurality of message queues stored in a memory, each message queue executable by a processor to receive and store a request for service;
   a plurality of service instances stored in a memory, each service instance associated with one of the message queues and each service instance executable by a processor to process requests on one of the plurality of message queues;
   a service instance controller stored in a memory and executable by a processor to monitor the depth of requests on each message queue, to create new instances of service instances associated with a message queue with a depth of requests that exceeds a queue depth threshold, to monitor an idle time of service instances, and to stop service instances when the idle time of the service instance exceeds an idle time threshold;

a manager component stored on a computer readable storage medium and executable by a processor to determine a message queue server utilization;

a notification component stored on a computer readable storage medium and executable by a processor to issue a first notification that notifies one or more requesting applications of the availability of additional processing resources when the message queue server utilization drops below a minimum utilization threshold, wherein the first notification further prompts the one or more applications to generate message requests to increase the message queue server utilization, and wherein the first notification further prompts the one or more applications to begin batch processing;

wherein the notification component is further executable to issue a second notification that notifies the one or more applications when the message queue server utilization rises above a maximum utilization threshold and prompts the one or more applications to reduce the message requests from the one or more applications.

7. The data processing system of claim 6, further including:
a web server stored on a computer readable storage medium and executable by a processor to receive a request from a web client, to send the request in a message to one of the message queues, to retrieve a response to the request from the one of the message queues, and to return the response to the web client.

8. The data processing system of claim 6, further including:
one or more data stores, the service instances further executable to access the data stores to create, read, write, and delete data entries.

9. The data processing system of claim 6, wherein the queue depth threshold and the idle time threshold are configurable.

10. The data processing system of claim 6 wherein the service instance controller determines the depth of requests on each message queue on a periodic interval and wherein the periodic interval is configurable.

* * * * *

UNITED STATES PATENT AND TRADEMARK OFFICE
CERTIFICATE OF CORRECTION

PATENT NO. : 7,634,542 B1  Page 1 of 1
APPLICATION NO. : 11/173246
DATED : December 15, 2009
INVENTOR(S) : Krause et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1145 days.

Signed and Sealed this

Ninth Day of November, 2010

David J. Kappos
*Director of the United States Patent and Trademark Office*